(12) United States Patent
Ching et al.

(10) Patent No.: US 12,498,808 B2
(45) Date of Patent: Dec. 16, 2025

(54) TOUCHSCREEN CONTROL DEVICE HAVING CONDUCTIVE SCREEN CONNECTORS

(71) Applicant: Wai Lok Whitney Ching, Chaiwan (HK)

(72) Inventors: Wai Lok Whitney Ching, Chaiwan (HK); Ryo Nakaya, Chaiwan (HK)

(73) Assignee: Wai Lok Whitney Ching, Chaiwan (HK)

( * ) Notice: Subject to any disclaimer, the term of this patent is extended or adjusted under 35 U.S.C. 154(b) by 0 days.

(21) Appl. No.: 18/851,395

(22) PCT Filed: Mar. 30, 2023

(86) PCT No.: PCT/IB2023/053188
§ 371 (c)(1),
(2) Date: Sep. 26, 2024

(87) PCT Pub. No.: WO2023/187708
PCT Pub. Date: Oct. 5, 2023

(65) Prior Publication Data
US 2025/0173009 A1    May 29, 2025

(30) Foreign Application Priority Data
Mar. 31, 2022 (GB) .................................... 2204646

(51) Int. Cl.
*G06F 3/04886* (2022.01)
*G06F 3/039* (2013.01)
(Continued)

(52) U.S. Cl.
CPC .......... *G06F 3/0393* (2019.05); *G06F 3/0418* (2013.01); *G06F 3/0442* (2019.05); *G06F 3/04886* (2013.01); *G06F 1/1607* (2013.01)

(58) Field of Classification Search
CPC .... G06F 3/0393; G06F 3/0442; G06F 3/0418; G06F 3/04886; G06F 1/1607
See application file for complete search history.

(56) References Cited

U.S. PATENT DOCUMENTS

| | | |
|---|---|---|
| 2006/0256090 A1 | 11/2006 | Huppi |
| 2013/0215029 A1 | 8/2013 | Comer, Jr. |

(Continued)

FOREIGN PATENT DOCUMENTS

| | | |
|---|---|---|
| CN | 105930087 A | 9/2016 |
| EP | 2755125 A2 | 7/2014 |

(Continued)

OTHER PUBLICATIONS

International Search report for PCT/IB2023/053188, prepared by the European Patent Office, mailing date Jul. 11, 2023, 4 pages.

*Primary Examiner* — Afroza Chowdhury
(74) *Attorney, Agent, or Firm* — Brooks Kushman P.C.

(57) ABSTRACT

In general terms the present invention proposes a touchscreen control device. The touchscreen control device having a manually operable conductive controller. The touchscreen control device also includes first and second conductive screen connectors for attaching the device to a touchscreen. The controller is moveable from a first position in which it is conductively coupled to the first screen connector for providing a first electrical signal to the touchscreen to a second position in which it is conductively coupled to both the first and second screen connectors for providing a second electrical signal to the touchscreen.

20 Claims, 10 Drawing Sheets

(51) Int. Cl.
  *G06F 3/041* (2006.01)
  *G06F 3/044* (2006.01)
  *G06F 1/16* (2006.01)

(56) References Cited

U.S. PATENT DOCUMENTS

| | | | |
|---|---|---|---|
| 2013/0249830 A1* | 9/2013 | Quek | G06F 3/0393 345/173 |
| 2014/0200081 A1* | 7/2014 | Ying | A63F 13/2145 463/37 |
| 2015/0220147 A1 | 8/2015 | King et al. | |
| 2018/0024649 A1 | 1/2018 | Uno | |
| 2018/0046267 A1* | 2/2018 | Kobayashi | G06F 3/03 |

FOREIGN PATENT DOCUMENTS

| | | |
|---|---|---|
| EP | 3287875 A1 | 2/2018 |
| EP | 3617854 A1 | 3/2020 |
| WO | 2020246076 A1 | 12/2020 |

\* cited by examiner

TOUCHSCREEN CONTROL DEVICE HAVING CONDUCTIVE SCREEN CONNECTORS

CROSS-REFERENCE TO RELATED APPLICATION

This application is the U.S. national phase of PCT Application No. PCT/IB2023/053188 filed on Mar. 30, 2023, which claims priority to GB Patent Application No. 2204646.0 filed on Mar. 31, 2022, the disclosures of which are incorporated in their entirety by reference herein.

TECHNICAL FIELD

This invention relates to touchscreen control. In particular, though not exclusively, this invention relates to a touchscreen control device and a method of calibrating the touchscreen control device.

BACKGROUND

Touchscreens are becoming ever more common in modern life, both for personal usage and for professional usage. The benefit of touchscreens is that an input device, such as a keyboard, and a display device, such as a monitor, can be combined into one, offering increased portability and simplicity. Many industries, for example, the music industry, now commonly use touchscreen devices to make various processes easier.

Mobile and computer applications for virtual disk jockey (DJ) sets already exist which allow DJs to manipulate music via a touchscreen device. Typically, multiple functions can be performed via the touchscreen device such as tempo control, scratching, and fading, without the need to transport multiple pieces of equipment. However, due to the nature of a touchscreen device, these functions can be challenging to operate. For example, the size of a touchscreen is typically much smaller than the size of a turntable which makes small and refined movements difficult to perform. Moreover, friction between the user's fingers during operation makes it difficult to operate the touchscreen smoothly. Furthermore, touchscreen virtual DJ sets lack the purchase which traditional DJ sets provide via buttons and sliders.

To overcome the difficulties associated with operating touchscreen devices, an external device can be combined with the touchscreen device. However, such external devices may need to be connected to the touchscreen device by a cable, which reduces the portability and simplicity of the experience and adds additional cost. The external device may also need to be connected to an additional audio output device via another cable, further reducing the portability of the product. Additionally, these external devices require frequent maintenance to clear built up dust which can negatively affect the audio quality.

Some external devices exist which do not need to be connected to the touchscreen device by a cable and can instead connect via wireless communication. However, these devices require frequent charging and pairing with the touchscreen device which adds a time delay to use of the DJ set. Furthermore, it is necessary to secure a place for this additional device while in use.

Consequently, there remains a need for improved touchscreen control devices which can overcome the aforementioned drawbacks. It is an object of the invention to address at least one of the above problems, or another problem associated with the prior art.

SUMMARY OF THE INVENTION

A first aspect of the invention provides a touchscreen control device comprising a manually operable conductive controller. The touchscreen control device also comprises first and second conductive screen connectors for attaching the device to a touchscreen, for example, such as a capacitive touchscreen. The manually operable conductive controller is moveable from a first position in which it is conductively coupled to the first conductive screen connector for providing a first electrical signal to the touchscreen to a second position in which it is conductively coupled to: (i) only the second conductive screen connector for providing a second electrical signal to the touchscreen; or (ii) both the first and second conductive screen connectors for providing a second electrical signal to the touchscreen.

Suitably, in the first position, the manually operable conductive controller may be conductively coupled to only the first conductive screen connector for providing a first electrical signal to the touchscreen.

In this way, it is possible to manipulate the manually operable conductive controller to perform small and refined movements that can be detected by the touchscreen. Moreover, the manually operable conductive controller allows the touchscreen to be operated without the user needing to use their fingers directly on the surface of the touchscreen, thereby avoiding any friction between the user's fingers and the touchscreen which might otherwise make it difficult to operate the touchscreen smoothly. Additionally, the touchscreen control device according to the invention does not require any cables or a wireless connection to connect to the touchscreen.

In some embodiments, the second electrical signal may comprise an electrical signal from only the second conductive screen connector. In some embodiments, the second electrical signal may comprise electrical signals from both the first and second conductive screen connectors simultaneously.

Suitably, the first and second conductive screen connectors may be configured to removably attach the touchscreen control device to a touchscreen.

Suitably, the first electrical signal may be provided to the touchscreen from a user touching the manually operable conductive controller when it is in the first position. Suitably, the second electrical signal may be provided to the touchscreen from a user touching the manually operable conductive controller when it is in the second position.

In some embodiments, the touchscreen control device may comprise a third conductive screen connector. The manually operable conductive controller may be moveable from the first position to a third position in which it is conductively coupled to: (i) only the third conductive screen connector for providing a third electrical signal to the touchscreen; or (ii) both the first and third conductive screen connectors for providing a third electrical signal to the touchscreen.

In some embodiments, the third electrical signal may comprise an electrical signal from only the third conductive screen connector. In some embodiments, the third electrical signal may comprise electrical signals from both the first and third conductive screen connectors simultaneously.

Suitably, the third conductive screen connector may be configured to removably attach the touchscreen control device to a touchscreen.

Suitably, the third electrical signal may be provided to the touchscreen from a user touching the manually operable conductive controller when it is in the third position.

In some embodiments, the touchscreen control device may be arranged such that movement of the manually operable conductive controller from the first position to the second position is in an opposite direction to movement of the manually operable conductive controller from the first position to the third position.

In some embodiments, the touchscreen control device may comprise a guide for guiding movement of the manually operable conductive controller between the first and second positions. For example, the guide may comprise a slot through which at least part of the manually operable conductive controller may be arranged. In some embodiments, the slot may be generally elongate. Suitably, the guide may define a generally linear slot.

In some embodiments, the touchscreen control device may comprise a guide for guiding movement of the manually operable conductive controller between the first, second and third positions. For example, the guide may comprise a slot through which at least part of the manually operable conductive controller may be arranged. In some embodiments, the slot may be generally elongate. Suitably, the guide may define a generally linear slot.

In some embodiments, the touchscreen control device may comprise a housing comprising the guide.

In some embodiments, the manually operable conductive controller may comprise one or more of a fader knob, slider, switch and/or joystick.

In some embodiments, one or more of the conductive screen connectors may be a conductive suction cup.

In some embodiments, the touchscreen control device may comprise a first conductive contact conductively coupled to the second conductive screen connector for calibrating the touchscreen control device to a touchscreen. Suitably, this may allow first and second electrical signals to be provided to the touchscreen from the manually operable conductive controller and the first conductive contact, through the first and second conductive screen connectors respectively, when the manually operable conductive controller is in the first position in order to calibrate the touchscreen control device.

In some embodiments, the touchscreen control device may comprise a first conductive contact conductively coupled to the second conductive screen connector and a second conductive contact conductively coupled to the third conductive screen connector for calibrating the touchscreen control device to a touchscreen. Suitably, this may allow first and second electrical signals to be provided to the touchscreen from the first and second conductive contacts, through the second and third conductive screen connectors respectively, when the manually operable conductive controller is in the first position in order to calibrate the touchscreen control device.

In some embodiments, the first and/or second conductive contact may comprise a conductive pin.

The invention envisages a method of calibrating a touchscreen control device according to the first aspect of the invention comprising a first conductive contact. The method comprises the steps of:

positioning the touchscreen control device on a pre-defined area or section of a touchscreen;
receiving an input from a user touching the first conductive contact on the touchscreen control device and touching the manually operable conductive controller when the manually operable conductive controller is in the first position;
detecting a first electrical signal from the second conductive screen connector corresponding to the first conductive contact and a second electrical signal from the first conductive screen connector corresponding to the manually operable conductive controller;
determining whether the first and second electrical signals are received at a first point on the touchscreen and a second point on the touchscreen simultaneously and that the first and second points are spaced apart by at least a threshold distance; and
calibrating the touchscreen control device based on the determining of the first point and the second point.

A second aspect of the invention provides a method of calibrating a touchscreen control device according to the first aspect of the invention comprising first and second conductive contacts. The method comprises the steps of:

positioning the touchscreen control device on a pre-defined area or section of a touchscreen;
receiving an input from a user touching the first and second conductive contacts on the touchscreen control device when the manually operable conductive controller is in the first position;
detecting a first electrical signal from the second conductive screen connector corresponding to the first conductive contact and a second electrical signal from the third conductive screen connector corresponding to the second conductive contact;
determining whether the first and second electrical signals are received at a first point on the touchscreen and a second point on the touchscreen simultaneously and that the first and second points are spaced apart by at least a threshold distance; and
calibrating the touchscreen control device based on the determining of the first point and the second point.

In this way, the touchscreen control device may advantageously be used with touchscreens of varying size (i.e. with touchscreen devices having screens of different sizes).

Suitably, the step of calibrating the touchscreen control device based on the determining of the first point and the second point may comprise adjusting the size of the pre-defined area or section of the touchscreen. This may advantageously allow the size of the pre-defined area or section on touchscreens of various sizes (i.e. on touchscreen devices having screens of different sizes) to be adjusted according to the size of the touchscreen control device.

In some embodiments, the method may comprise determining whether the first and/or second points are positioned within the pre-defined area or section of the touchscreen.

In some embodiments, the method may comprise defining a first calibrated area at the centre of the first point and/or a second calibrated area at the centre of the second point.

In some embodiments, the method may comprise defining a third calibrated area at a third point positioned midway between the first point and the second point.

In some embodiments, the threshold distance may be equal to or greater than 30 mm. For example, the threshold distance may be equal to or greater than 33 mm.

Throughout the description and claims of this specification, the words "comprise" and "contain" and variations of the words, for example "comprising" and "comprises", mean "including but not limited to", and do not exclude other components, integers or steps. Moreover, the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
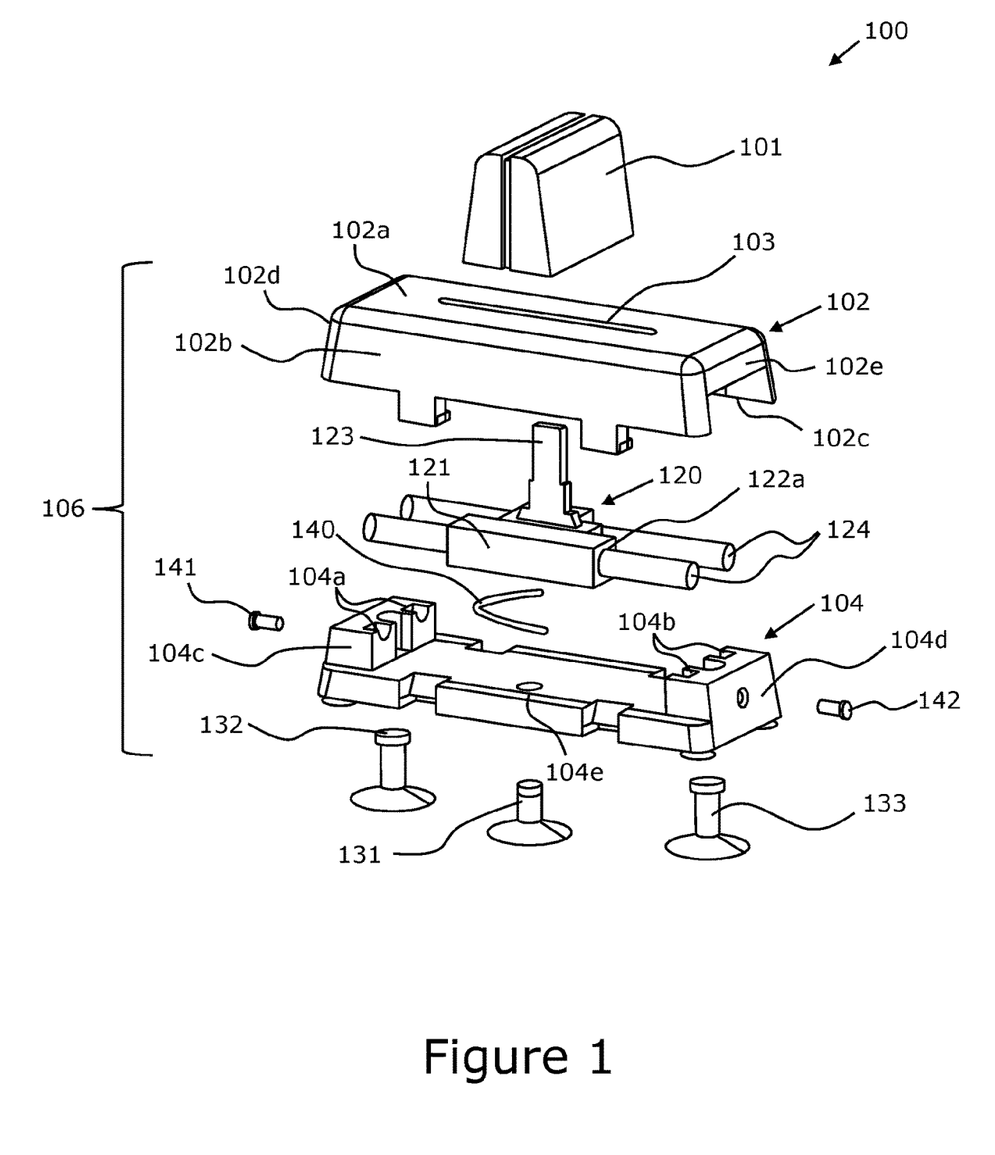
FIG. 1 is an exploded perspective view of a touchscreen control device in accordance with a first embodiment of the invention.

Referring to FIG. 1, a touchscreen control device 100 in accordance with a first embodiment of the invention comprises an elongate guide portion 102 and an elongate base portion 104, which connect together to form a housing 106 defining an enclosed volume. The guide portion 102 is generally trough shaped, having an elongate base 102a, two sides 102b, 102c and two ends 102d, 102e. The base 102a of the guide portion 102 has a narrow elongate slit 103, which extends along about ⅔ of the elongate length of the base 102a.

A metal lever 120 and a pair of cylindrical guide rails 124 are arranged within the enclosed volume of the housing 106. The cylindrical guide rails 124 are held in place by two pairs of recesses 104a, 104b formed in projections 104c, 104d at each end of the base portion 104. The metal lever 120 has a base portion 121 which comprises a pair of cylindrical holes 122a, 122b, which the pair of cylindrical guide rails 124 pass through. The metal lever 120 is thus moveable linearly with respect to the elongate length of the base portion 104, along the cylindrical guide rails 124 from one end of the base portion 104 to the other.

The metal lever 120 also has a thin upstanding portion 123, which is arranged to pass through the elongate slit 103 of the guide portion 102 from the inside of the housing 106 to the outside and connect to a manually operable conductive controller 101 which sits above the guide portion 102 outside of the housing 106. In this way, the metal lever 120 can be moved along the cylindrical guide rails 124 by moving the operable conductive controller 101 back and forth along the elongate slit 103 of the guide portion 102. The manually operable conductive controller 101 is made of an electrically conductive material and so is in electrical connection with the metal lever 120, which, being made of metal, is also electrically conductive.

A first conductive suction cup 131 is arranged outside of the housing 106 and extends through a hole 104e in the base portion 104 about halfway along its elongate length. In this example, the first conductive suction cup 131 is made from silicon. The first conductive suction cup 131 is connected electrically to the metal lever 120 by a flexible cable 140 arranged inside the housing 106. The flexible cable 140 is of sufficient length such that as the metal lever 120 is moved back and forth along the full length of the cylindrical guide rails 124 from one end of the base portion 104 to the other, the flexible cable 140 remains connected to the first conductive suction cup 131.

Second and third conductive suction cups 132, 133 are also arranged outside of the housing 106 and extend through holes 104f, 104g at each end of the base portion 104 adjacent to the projections 104c, 104d. The second and third conductive suction cups 132, 133 are also made from silicon. In this way, when the metal lever 120 is moved to either end of the cylindrical guide rails 124, it contacts and thus becomes electrically connected to either the second or third conductive suction cups 132, 133 respectively. First and second conductive pins 141, 142 also extend through the projections 104c, 104d from outside of the housing 106 through to the inside, where they are in electrical connection with the second and third conductive suction cups 132, 133 respectively.

Figure 2:
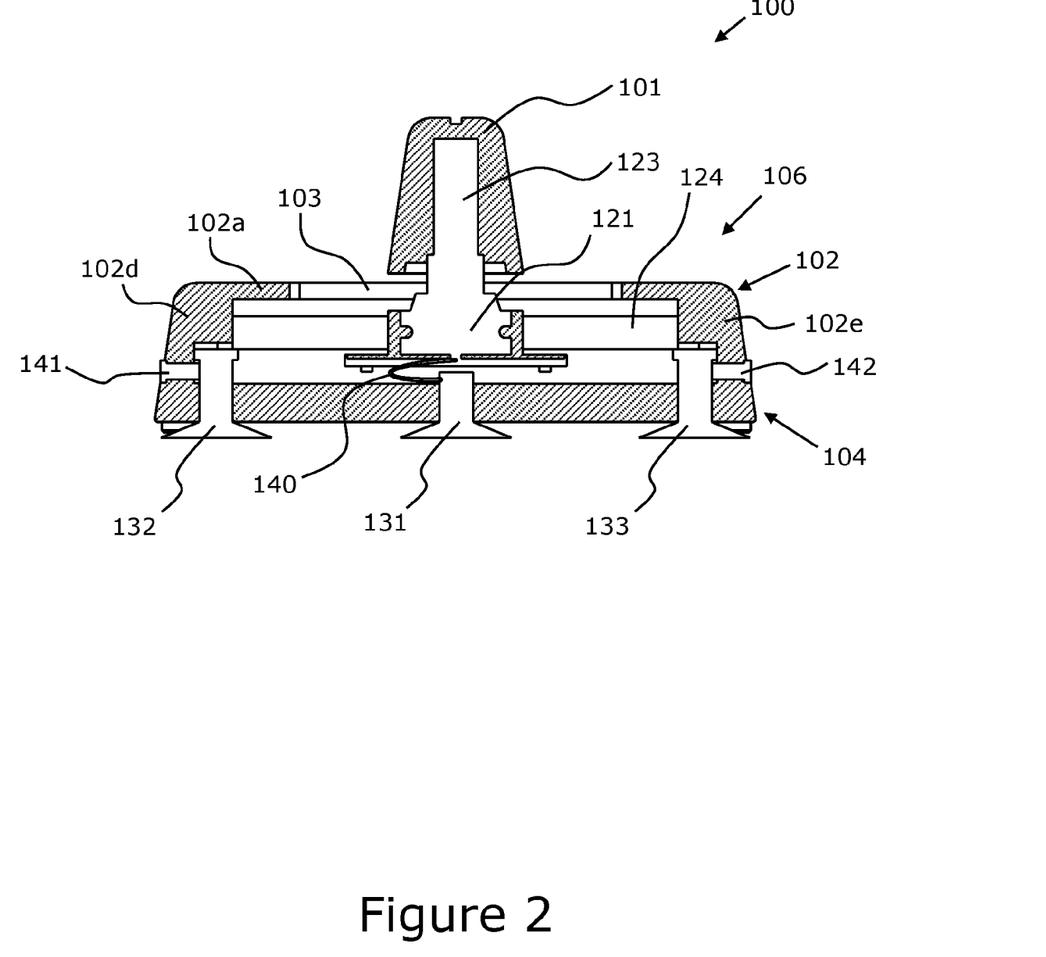
FIG. 2 is a cross sectional view of a touchscreen control device in accordance with the first embodiment of the invention.

FIG. 2 shows a cross sectional view of the fully assembled touchscreen control device 100.

Figure 3:
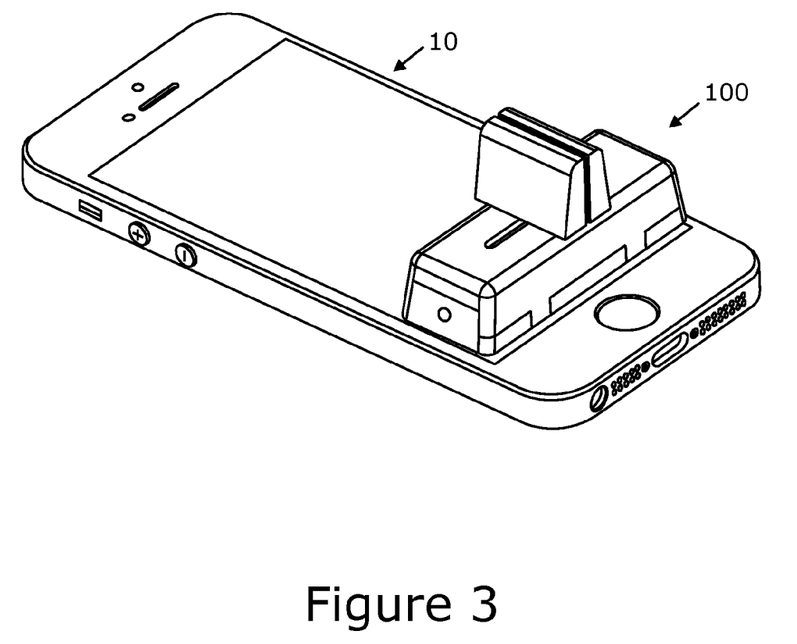
FIG. 3 is a perspective view of a touchscreen control device in accordance with the first embodiment of the invention attached to a smartphone.

In use, the touchscreen control device 100 is attached to the touchscreen of a device for example such as a smart phone or touchscreen computer, by the first, second and third conductive suction cups 131, 132, 133. FIG. 3 shows the touchscreen control device 100 attached to the touchscreen of a smartphone 10.

Figure 4:
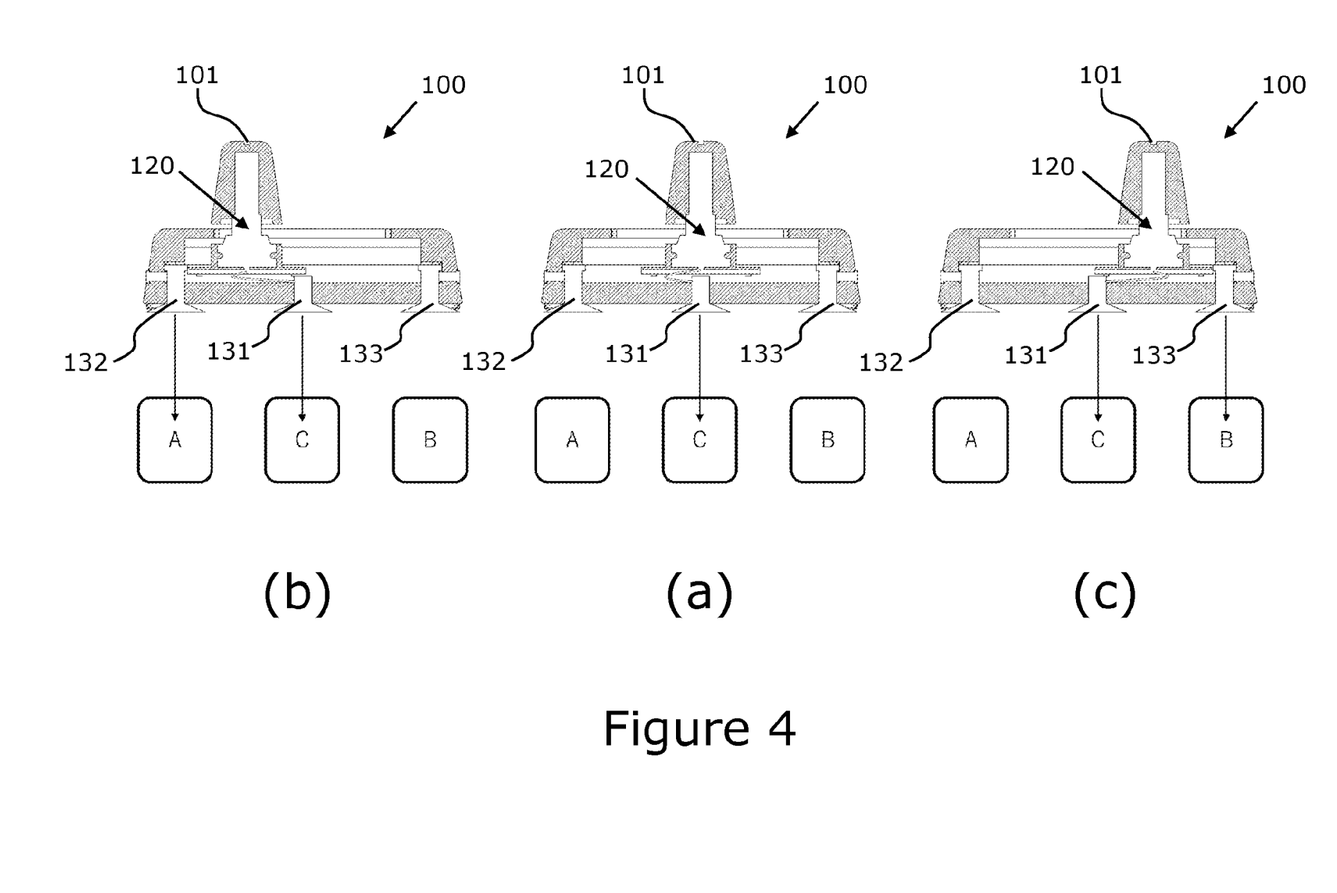
FIG. 4 illustrates the manually operable conductive controller of a touchscreen control device in accordance with the first embodiment in (a) first, (b) second, and (c) third positions.

Referring now to FIG. 4(a), in a first position the manually operable conductive controller 101 is located at or towards the middle of the elongate slit 103, as shown in FIG. 4(a). In the first position, the manually operable conductive controller 101 is in electrical contact with only the first conductive suction cup 131, via the metal lever 120 and the flexible cable 140. Thus, when a user touches the manually operable conductive controller 101 when it is in the first position, an electrical signal is sent from the user through the manually operable conductive controller 101 and through the metal lever 120 and flexible cable 140 to the first conductive suction cup 131. A single electrical signal is therefore received by the touchscreen of the touchscreen device (at position C as shown in FIG. 4) from the first conductive suction cup 131.

Referring to FIG. 4 (b), the manually operable conductive controller 101 may be moved by the user from the first position to a second position in which the metal lever 120 is in contact with the second conductive suction cup 132, by moving the manually operable conductive controller 101 all the way to the far end of the slit 103 in the direction of the second conductive suction cup 132. Thus, when the user touches the manually operable conductive controller 101 when it is in the second position, an electrical signal is sent from the user through the manually operable conductive controller 101 and through the metal lever 120 to the second conductive suction cup 132 and through the flexible cable 140 to the first conductive suction cup 131. Two electrical signals are therefore received by the touchscreen of the touchscreen device (at positions A and C as shown in FIG. 4) from the first and second conductive suction cups 131, 132.

Referring to FIG. 4(c), the manually operable conductive controller 101 may be moved by the user from the first position to a third position in which the metal lever 120 is in contact with the third conductive suction cup 133, by moving the manually operable conductive controller 101 all the way to the far end of the slit 103 in the direction of the third conductive suction cup 133. Thus, when the user touches the manually operable conductive controller 101 when it is in the third position, an electrical signal is sent from the user through the manually operable conductive controller 101 and through the metal lever 120 to the third conductive suction cup 133 and through the flexible cable 140 to the first conductive suction cup 131. Two electrical signals are therefore received by the touchscreen of the touchscreen device (at positions C and B as shown in FIG. 4) from the first and third conductive suction cups 131, 133.

Figure 5:
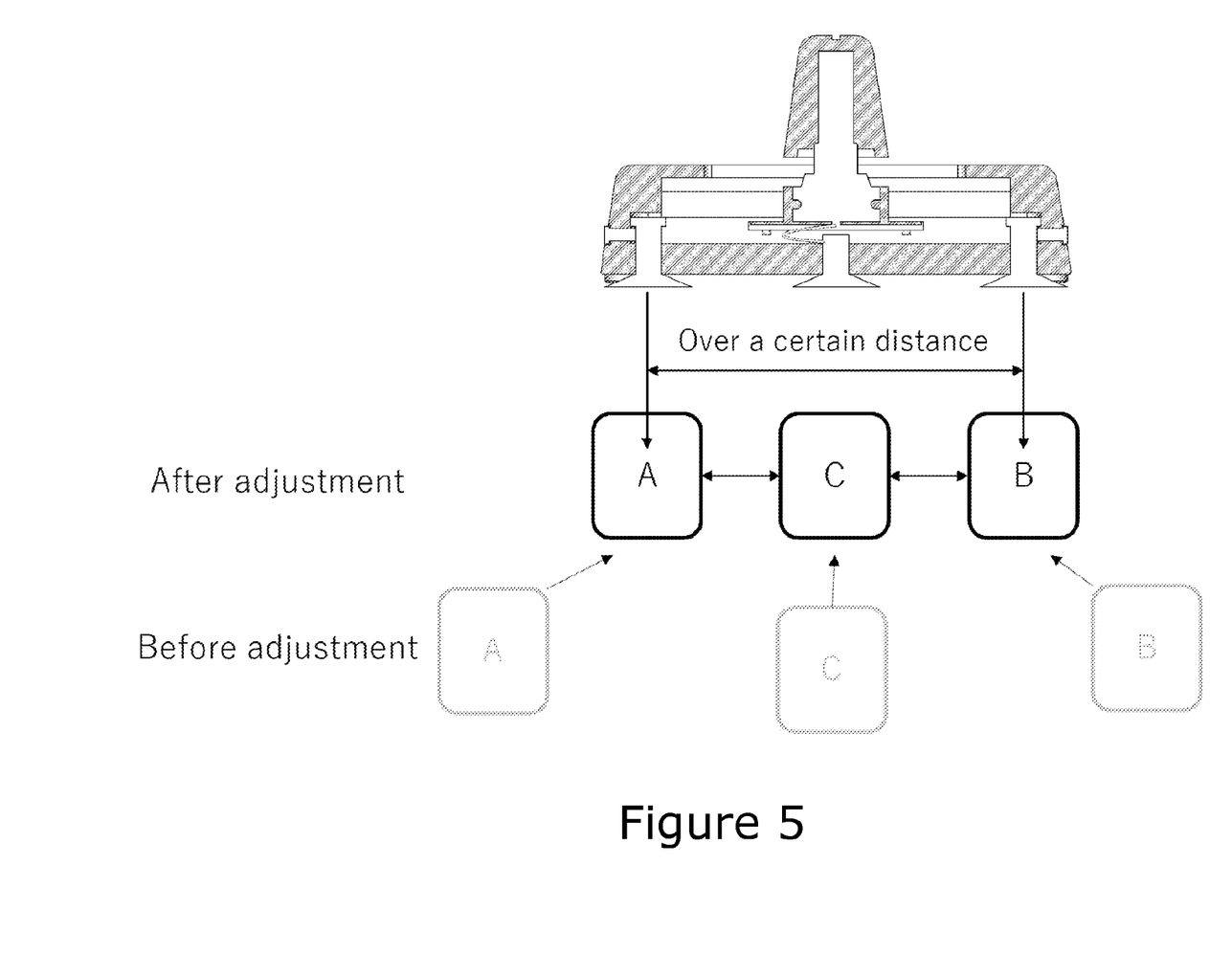
FIG. 5 illustrates calibration of a touchscreen control device in accordance with the first embodiment of the invention.

Referring now to FIG. 5, the touchscreen control device may be used in conjunction with an application (i.e. app) or computer program on a device comprising a touchscreen. The application of computer program may display a pre-defined area on the touchscreen for the touchscreen control device to be attached. The application or computer program may be configured to detect electrical signals from the touchscreen control device in the pre-defined area on the touchscreen.

As mentioned above, first and second conductive pins 141, 142 extend through the projections 104c, 104d of the base 104 from outside of the housing 106 through to the inside, where they are in electrical connection with the second and third conductive suction cups 132, 133 respectively. The first and second conductive pins 141, 142 enable a user to provide first and second electrical signals to the touchscreen from the first and second conductive pins 141, 142, through the second and third conductive suction cups 132, 133 respectively, when the manually operable conductive controller 101 is in the first position.

In this specific example, the distance between the second and third conductive screen connectors 132, 133 is 33 mm. Thus, the application or computer program may be configured such that when first and second electrical signals are simultaneously received from the second and third conductive screen connectors 132, 133 at first and second points on the touchscreen, if the first and second points are spaced apart by a threshold distance of 33 mm (432 PX) or more, it makes a determination that the first and second points correspond to the second and third conductive suction cups 132, 133 respectively. The application or computer program may also calculate the mid-point between the first and second points on the touchscreen to determine the position of the first conductive suction cup 131.

Figure 6:
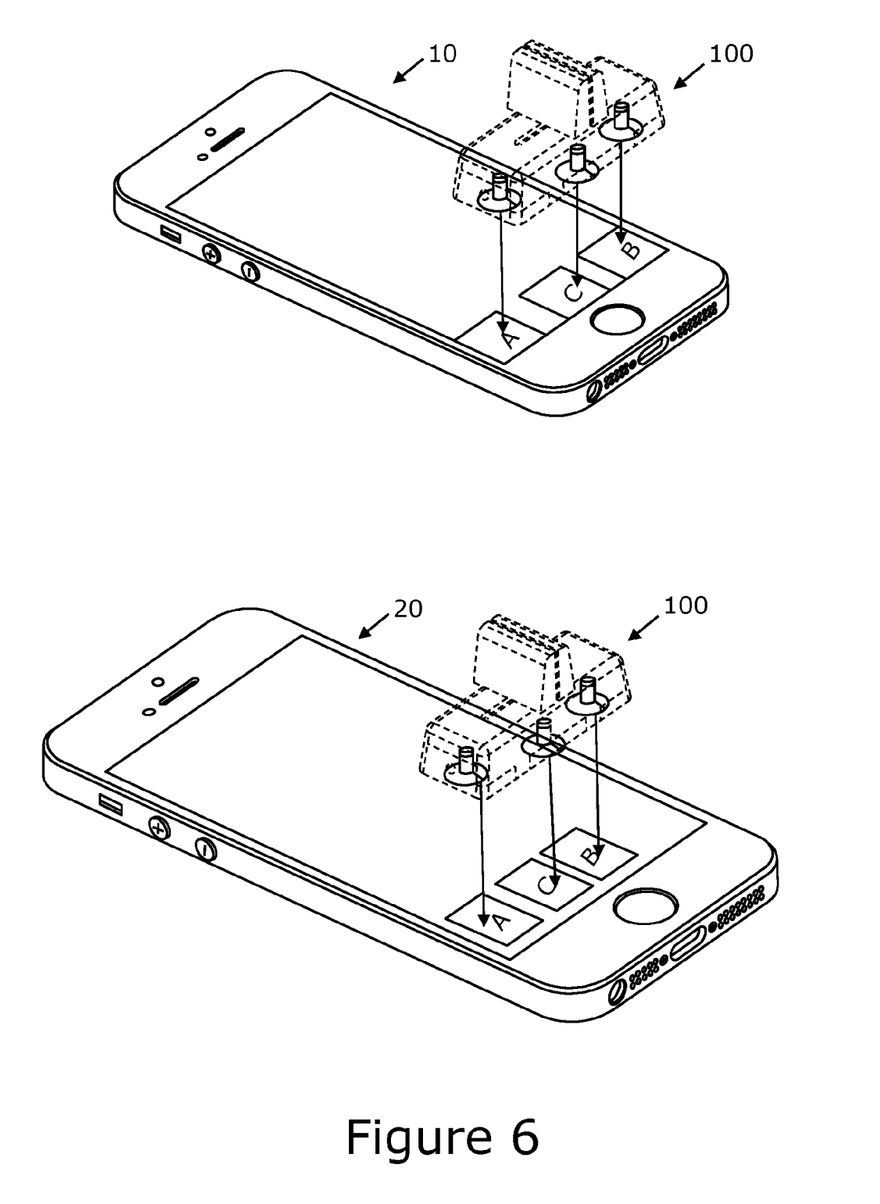
FIG. 6 illustrates calibration of a touchscreen control device in accordance with the first embodiment of the invention with touchscreen devices of different sizes.

In this way, the application or computer program is able to detect the position of the touchscreen control device 100 on the touchscreen and recalibrate the size of the display accordingly. Thus, the touchscreen control device 100 may be used with touchscreens of varying size, as shown in FIG. 6.

Figure 7:
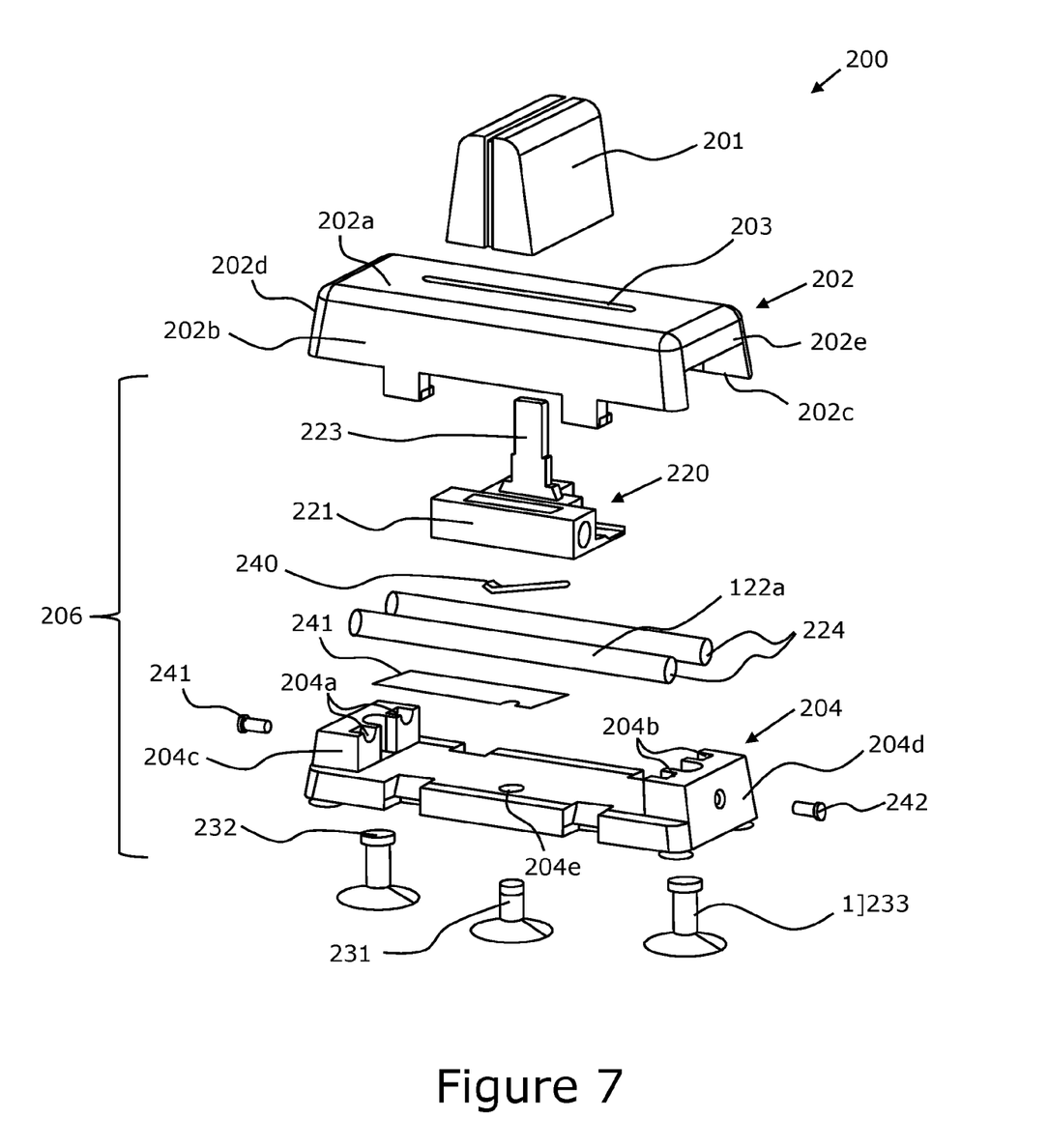
FIG. 7 is an exploded perspective view of a touchscreen control device in accordance with a second embodiment of the invention.
Figure 8:
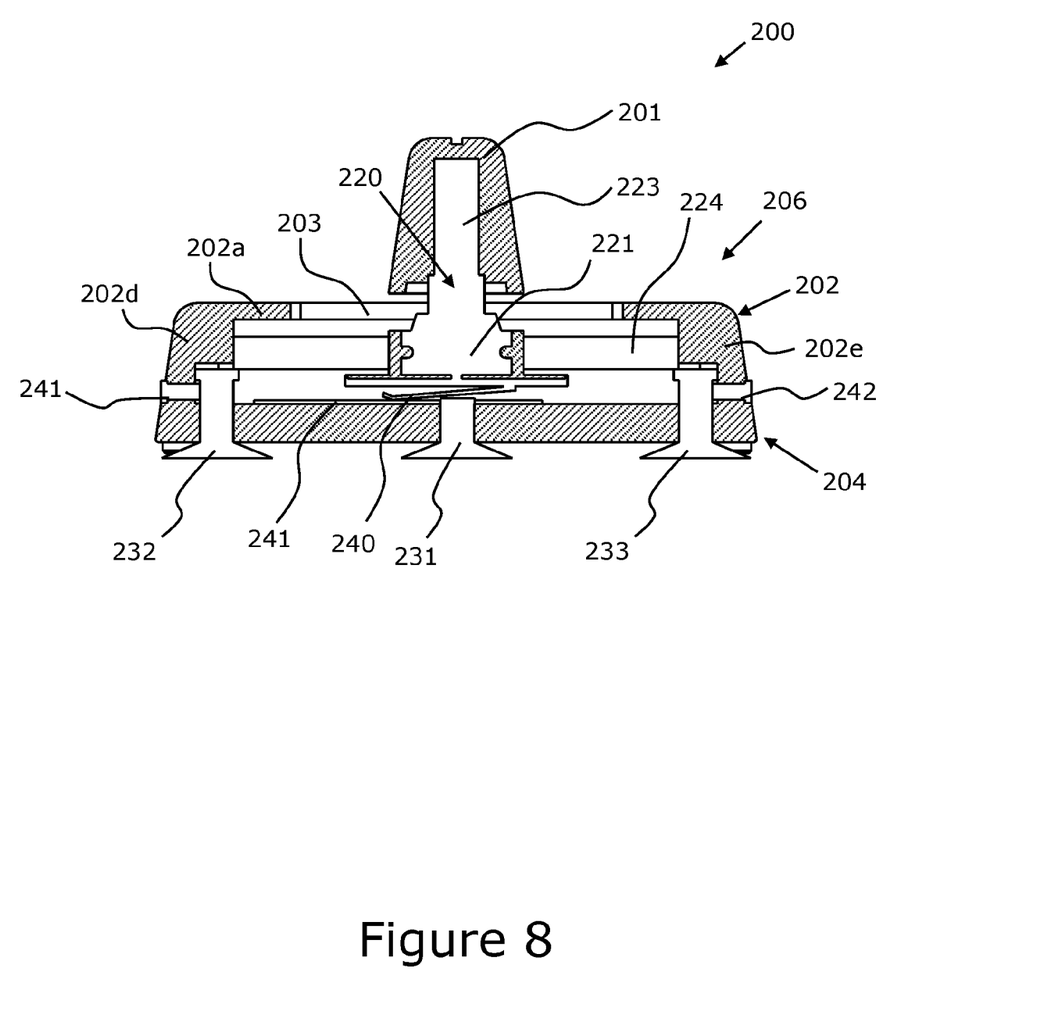
FIG. 8 is a cross sectional view of the touchscreen control device in accordance with the second embodiment of the invention.

FIGS. 7 and 8 show a touchscreen control device 200 in accordance with a second embodiment of the invention. The touchscreen control device 200 has the generally same structure as the touchscreen control device 100 in accordance with a first embodiment of the invention, the only exception being that the flexible cable 140 is replaced with a metal brush 240 and metal plate 241. The metal brush 240 is attached the metal lever 220. The metal plate 241 is attached to the base portion 204 over hole 204e so that it is in electrical contact with the first conductive suction cup 231. As the metal lever 220 is moved back and forth along the full length of the cylindrical guide rails 224 from one end of the base portion 204 to the other, the metal brush 240 slides across and remains in contact with the metal plate 241, thereby maintaining electrical contact with the first conductive suction cup 231.

Figure 9A:
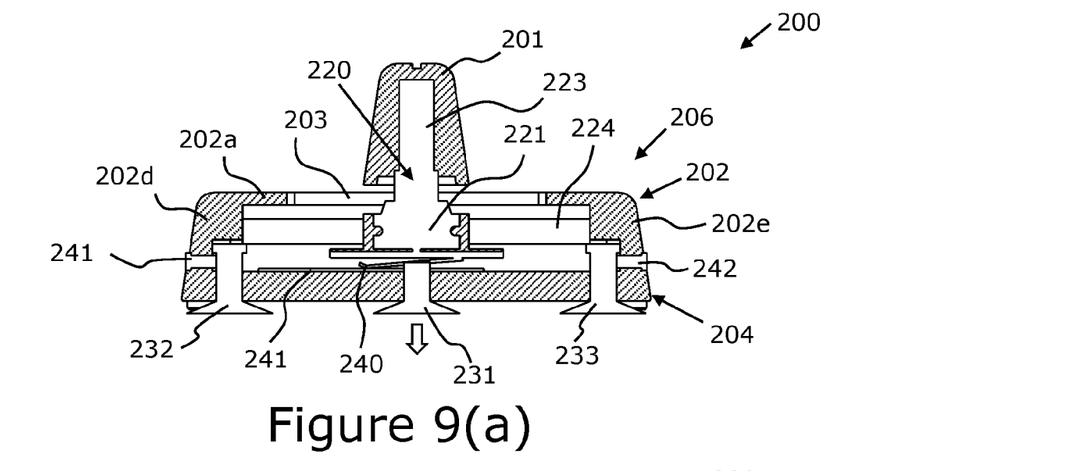
FIG. 9 illustrates the manually operable conductive controller of a touchscreen control device in accordance with the second embodiment in (a) first, (b) second, and (c) third positions.

Referring to FIG. 9(a), in a first position the manually operable conductive controller 201 is located at or towards the middle of the elongate slit 203, as shown in FIG. 9(a). In the first position, the manually operable conductive controller 201 is in electrical contact with only the first conductive suction cup 231, via the metal lever 220, the metal brush 240 and the metal plate 241. Thus, when a user touches the manually operable conductive controller 201 when it is in the first position, an electrical signal is sent from the user through the manually operable conductive controller 201, through the metal lever 220, the metal brush 240 and the metal plate 241 to the first conductive suction cup 231. A single electrical signal is therefore received by the touchscreen of the touchscreen device from the first conductive suction cup 231 (as indicated by the single arrow in FIG. 9(a)).

Figure 9B:
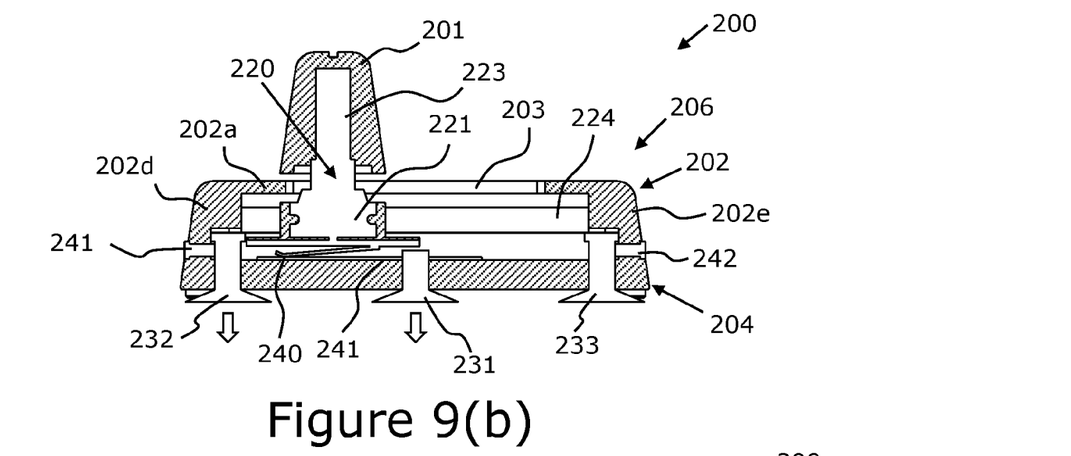

Referring to FIG. 9(b), the manually operable conductive controller 201 may be moved by the user from the first position to a second position in which the metal lever 220 is in contact with the second conductive suction cup 232, by moving the manually operable conductive controller 201 all the way to the far end of the slit 203 in the direction of the second conductive suction cup 232. As the manually operable conductive controller 201 is moved by the user from the first position to second position, the metal brush 240 slides along the metal plate 241. The metal plate 241 is configured such that it is of sufficient length that the metal brush 240 remains in contact with the metal plate 241 when the manually operable conductive controller 201 is in the second position, as shown in FIG. 9(b).

Thus, when the user touches the manually operable conductive controller 201 when it is in the second position, an electrical signal is sent from the user through the manually operable conductive controller 201 through the metal lever 220 to the second conductive suction cup 232, and through the metal lever 220, the metal brush 240 and the metal plate 241 to the first conductive suction cup 231. Two electrical signals are therefore received by the touchscreen of the touchscreen device from the first and second conductive suction cups 231, 232 (as indicated by the two arrows in FIG. 9(b)).

Figure 9C:
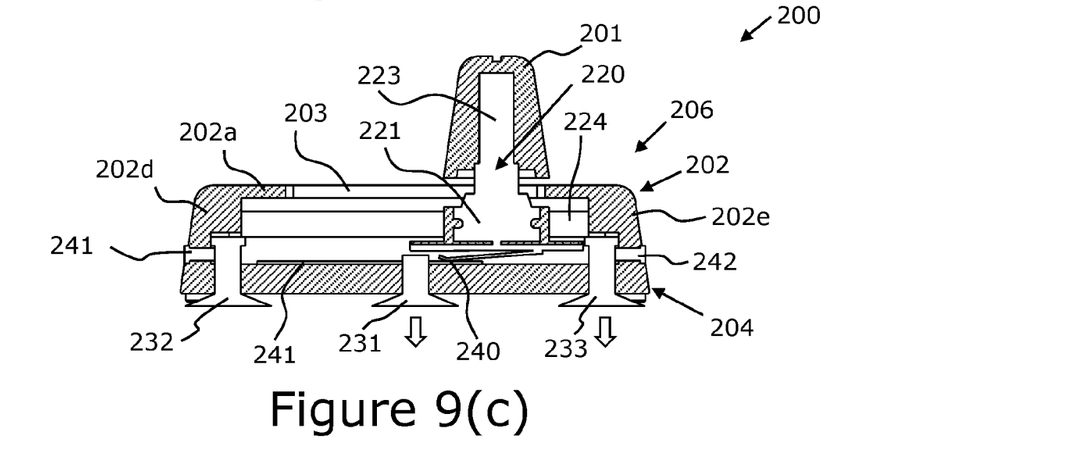

Referring to FIG. 9(c), the manually operable conductive controller 201 may be moved by the user from the first position to a third position in which the metal lever 220 is in contact with the third conductive suction cup 233, by moving the manually operable conductive controller 201 all the way to the far end of the slit 203 in the direction of the third conductive suction cup 233. As the manually operable conductive controller 201 is moved by the user from the first position to third position, the metal brush 240 slides along the metal plate 241. The metal plate 241 is configured such that it is of sufficient length that the metal brush 240 remains in contact with the metal plate 241 when the manually operable conductive controller 201 is in the third position, as shown in FIG. 9(*c*).

Thus, when the user touches the manually operable conductive controller 201 when it is in the third position, an electrical signal is sent from the user through the manually operable conductive controller 201 through the metal lever 220 to the third conductive suction cup 233, and through the metal lever 220, the metal brush 240 and the metal plate 241 to the first conductive suction cup 231. Two electrical signals are therefore received by the touchscreen of the touchscreen device from the first and third conductive suction cups 231, 233 (as indicated by the two arrows in FIG. 9(*c*)).

Figure 10A:
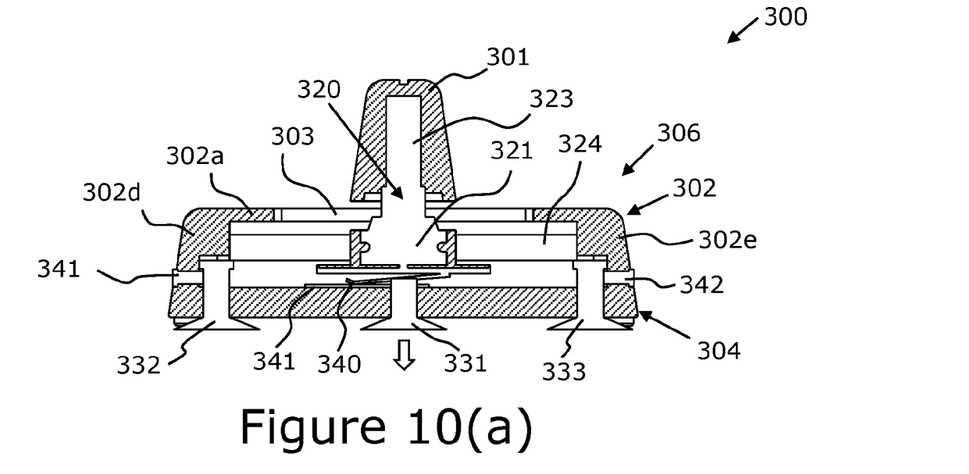
FIG. 10 illustrates the manually operable conductive controller of a touchscreen control device in accordance with a third embodiment in (a) first, (b) second, and (c) third positions.
Figure 10B:
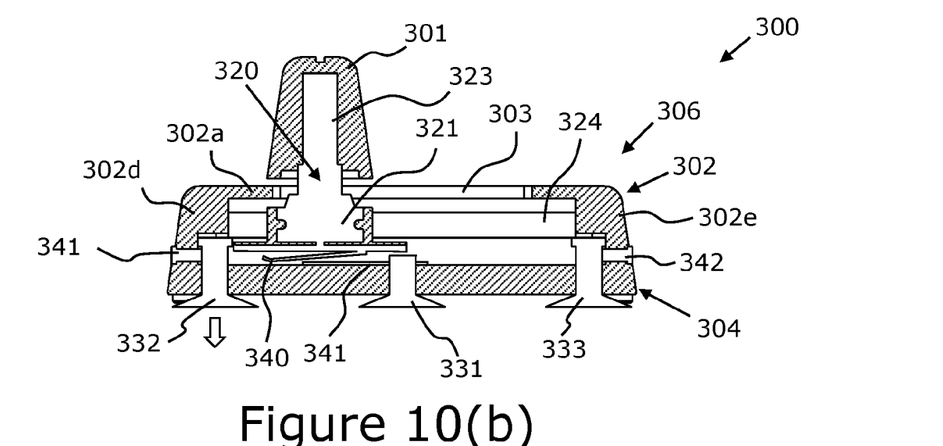
Figure 10C:
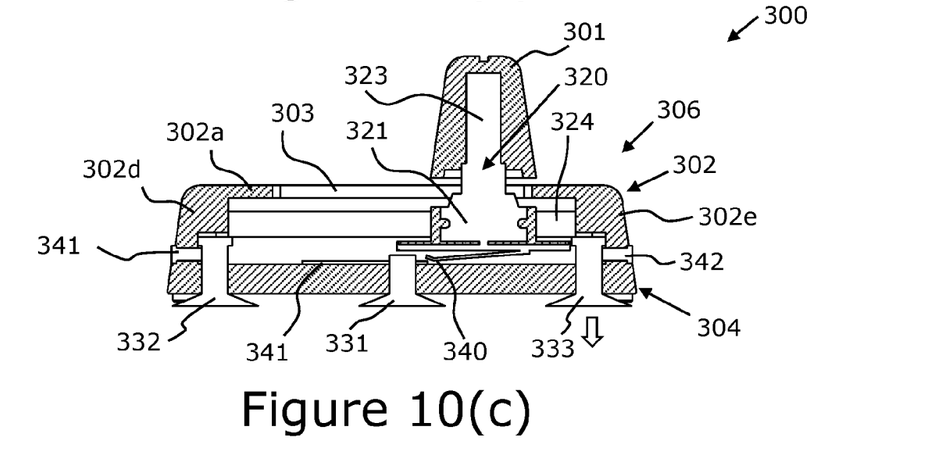

FIGS. 10(*a*) to 10(*c*) show a touchscreen control device 300 in accordance with a third embodiment of the invention. The touchscreen control device 300 has the generally same structure as the touchscreen control device 200 in accordance with the second embodiment of the invention. However, in the touchscreen control device 300, the length of the metal plate 341 is configured such that when the manually operable conductive controller 301 is in the second or third positions, the metal brush 340 moves beyond the length of the metal plate so that it is no longer in contact with (i.e. disconnects from) the metal plate 341. Thus, when the manually operable conductive controller 301 is in the second or third positions, there is no electrical contact between the manually operable conductive controller 301 and the first conductive suction cup 331.

Referring to FIG. 10(*a*), in a first position the manually operable conductive controller 301 is located at or towards the middle of the elongate slit 303, as shown in FIG. 10(*a*). In the first position, the manually operable conductive controller 301 is in electrical contact with only the first conductive suction cup 331, via the metal lever 320, the metal brush 340 and the metal plate 341. Thus, when a user touches the manually operable conductive controller 301 when it is in the first position, an electrical signal is sent from the user through the manually operable conductive controller 301, through the metal lever 320, the metal brush 340 and the metal plate 341 to the first conductive suction cup 331. A single electrical signal is therefore received by the touchscreen of the touchscreen device from the first conductive suction cup 331 (as indicated by the single arrow in FIG. 10(*a*)).

Referring to FIG. 10(*b*), the manually operable conductive controller 301 may be moved by the user from the first position to a second position in which the metal lever 320 is in contact with the second conductive suction cup 332, by moving the manually operable conductive controller 301 all the way to the far end of the slit 303 in the direction of the second conductive suction cup 332. As the manually operable conductive controller 301 is moved by the user from the first position to second position, the metal brush 340 slides past the end of the metal plate 341 such that it is no longer in contact with the metal plate 341 when the manually operable conductive controller 301 is in the second position, as shown in FIG. 10(*b*).

Thus, when the user touches the manually operable conductive controller 301 when it is in the second position, an electrical signal is sent from the user through the manually operable conductive controller 301 through the metal lever 320 to the second conductive suction cup 332 only. A single electrical signal is therefore received by the touchscreen of the touchscreen device from the second conductive suction cup 332 (as indicated by the single arrow in FIG. 10(*b*)).

Referring to FIG. 10(*c*), the manually operable conductive controller 301 may be moved by the user from the first position to a third position in which the metal lever 320 is in contact with the third conductive suction cup 333, by moving the manually operable conductive controller 301 all the way to the far end of the slit 303 in the direction of the third conductive suction cup 333. As the manually operable conductive controller 301 is moved by the user from the first position to third position, the metal brush 340 slides past the end of the metal plate 341 such that it is no longer in contact with the metal plate 341 when the manually operable conductive controller 301 is in the third position, as shown in FIG. 10(*b*).

Thus, when the user touches the manually operable conductive controller 301 when it is in the third position, an electrical signal is sent from the user through the manually operable conductive controller 301 through the metal lever 320 to the third conductive suction cup 333 only. A single electrical signal is therefore received by the touchscreen of the touchscreen device from the third conductive suction cup 333 (as indicated by the single arrow in FIG. 10(*c*)).

The invention claimed is:

1. A touchscreen control device comprising:
a controller, wherein the controller is a manually operable conductive controller;
first and second conductive screen connectors for attaching the touchscreen control device to a touchscreen;
wherein the controller is moveable from a first position in which it is conductively coupled to the first conductive screen connector for providing a first electrical signal to the touchscreen to a second position in which it is conductively coupled to: (i) the second conductive screen connector; or (ii) both the first and second conductive screen connectors for providing a second electrical signal to the touchscreen;
a third conductive screen connector; and
wherein the controller is moveable from the first position to a third position in which it is conductively coupled to: (i) the third conductive screen connector; or (ii) both the first and third conductive screen connectors for providing a third electrical signal to the touchscreen.

2. The touchscreen control device of claim 1, wherein the touchscreen control device is arranged such that movement of the controller from the first position to the second position is in an opposite direction to movement of the controller from the first position to the third position.

3. The touchscreen control device of claim 1, further comprising a guide for guiding movement of the controller between the first and second positions.

4. The touchscreen control device of claim 1, further comprising a guide for guiding movement of the controller between the first, second, and third positions.

5. The touchscreen control device of claim 1, wherein the controller comprises one or more of a fader knob, slider, switch, and/or joystick.

6. The touchscreen control device of claim 1, wherein one or more of the conductive screen connectors is a conductive suction cup.

7. The touchscreen control device of claim 1, further comprising a first conductive contact conductively coupled to the second conductive screen connector to allow first and second electrical signals to be provided to the touchscreen from the controller and the first conductive contact through the first and second conductive screen connectors when the controller is in the first position.

8. The touchscreen control device of claim 1, further comprising a first conductive contact conductively coupled to the second conductive screen connector and a second conductive contact conductively coupled to the third conductive screen connector to allow first and second electrical signals to be provided to the touchscreen from the first and second conductive contacts through the second and third conductive screen connectors when the controller is in the first position.

9. The touchscreen control device of claim 7, wherein the first and/or second conductive contact is a conductive pin.

10. A method of calibrating a touchscreen control device, the touchscreen control device including a controller, first and second conductive screen connectors for attaching the touchscreen control device to a touchscreen, and a third conductive screen connector, wherein the controller is a manually operable conductive controller, the controller is moveable from a first position in which it is conductively coupled to the first conductive screen connector for providing a first electrical signal to the touchscreen to a second position in which it is conductively coupled to: (i) the second conductive screen connector; or (ii) both the first and second conductive screen connectors for providing a second electrical signal to the touchscreen, and the controller is moveable from the first position to a third position in which it is conductively coupled to: (i) the third conductive screen connector; or (ii) both the first and third conductive screen connectors for providing a third electrical signal to the touchscreen, the touchscreen control device further including a first conductive contact conductively coupled to the second conductive screen connector and a second conductive contact conductively coupled to the third conductive screen connector, the method comprising the steps of:
    positioning the touchscreen control device on a pre-defined area of a touchscreen;
    receiving an input from a user touching the first and second conductive contacts on the touchscreen control device when the controller is in the first position;
    detecting a first electrical signal from the second conductive screen connector corresponding to the first conductive contact and a second electrical signal from the third conductive screen connector corresponding to the second conductive contact;
    determining whether the first and second electrical signals are received at a first point and a second point simultaneously and that the first and second points are spaced apart by at least a threshold distance; and
    calibrating the touchscreen control device based on the determining of the first point and the second point.

11. The method of claim 10, further comprising determining whether the first and second points are positioned within the pre-defined area of the touchscreen.

12. The method of claim 10, further comprising defining a first calibrated area at the center of the first point and a second calibrated area at the center of the second point.

13. The method of claim 11, further comprising defining a third calibrated area at a third point positioned midway between the first point and the second point.

14. The method of claim 10, wherein the threshold distance is equal to or greater than 30 mm.

15. A touchscreen control device comprising:
    a controller, wherein the controller is a manually operable conductive controller; and
    first and second conductive screen connectors for attaching the touchscreen control device to a touchscreen;
    wherein the controller is moveable from a first position in which it is conductively coupled to the first conductive screen connector for providing a first electrical signal to the touchscreen to a second position in which it is conductively coupled to: (i) the second conductive screen connector; or (ii) both the first and second conductive screen connectors for providing a second electrical signal to the touchscreen; and
    a first conductive contact conductively coupled to the second conductive screen connector and a second conductive contact conductively coupled to the third conductive screen connector to allow first and second electrical signals to be provided to the touchscreen from the first and second conductive contacts through the second and third conductive screen connectors when the controller is in the first position.

16. The touchscreen control device of claim 15, wherein the touchscreen control device is arranged such that movement of the controller from the first position to the second position is in an opposite direction to movement of the controller from the first position to the third position.

17. The touchscreen control device of claim 15, further comprising a guide for guiding movement of the controller between the first and second positions.

18. The touchscreen control device of claim 15, further comprising a guide for guiding movement of the controller between the first, second, and third positions.

19. The touchscreen control device of claim 15, wherein the controller comprises one or more of a fader knob, slider, switch, and/or joystick.

20. The touchscreen control device of claim 15, wherein one or more of the conductive screen connectors is a conductive suction cup.

* * * * *